Patented Dec. 28, 1937

2,103,265

UNITED STATES PATENT OFFICE 2,103,265

ACRYLIC ACID DERIVATIVES

William A. Lott, Newark, N. J., assignor to E. R. Squibb & Sons, New York, N. Y., a corporation of New York No Drawing. Application September 12, 1933, Serial No. 689,158

13 Claims. (Cl. 260—103)

This invention relates to, and has for its object the provision of, certain acrylic acid derivatives.

The compositions embraced by this invention comprise compounds having the general formula

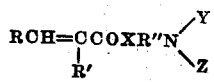

wherein R represents an alkyl, an aryl, or a substituted aryl, R' represents an alkyl or an aryl, R'' represents an alkylene or a substituted alkylene, X represents oxygen or substituted imidogen, and Y and Z represent alkyls or aralkyls; and the salts thereof. These compositions are characterized by valuable local-anesthetic properties. They may be prepared by causing the appropriate acyl chloride to react with the appropriate alcohol or diamine, or, where X is oxygen, by causing the sodium salt of the appropriate acid to react with the appropriate alkyl chloride.

Examples

1. Diethylaminoethyl (alpha ethyl) cinnamate hydrochloride,

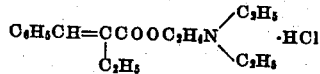

A solution of 16.2 g. of alpha ethyl cinnamyl chloride in 30 cc. of dry benzene is gradually mixed with a solution of 9.5 g. of diethylamino alcohol; after several hours diethylamino ethyl alcohol hydrochloride crystallizes out and is filtered off; the solution is concentrated to about 20 cc. and stored in the refrigerator; the yellow crystals formed during 24 hours are separated by filtration and washed with cold dry benzene, whereupon they become practically white; and additional crystals are obtained by further concentration of the filtrate. These crystals, which are the compound sought, melt at 147–148° C. and readily give aqueous solutions of a concentration exceeding 5%.

2. Diethylaminoethyl (alpha isopropyl) cinnamate hydrochloride,

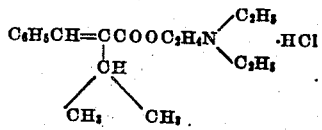

A solution of 1.1 g. of sodium in 30 cc. of absolute alcohol is mixed with a solution of 9 g. of alpha isopropyl cinnamic acid; to the clear solution of the sodium salt of the acid, thus prepared, a solution of 6.4 g. of diethylaminoethyl chloride is added; the mixture is boiled over a reflux condenser about four hours and the sodium chloride formed during the reaction is removed by filtration; the alcoholic solution of the amino ester is concentrated to about 20 cc. and neutralized with concentrated alcoholic hydrochloric acid; sufficient anhydrous ether is added to throw the hydrochloride of the amino ester out of solution; the product separated is dissolved in water, the solution is alkalinized and the free base of the amino ester is extracted with ether; this ethereal solution is thoroughly dried over fused potassium carbonate, and neutralized with concentrated alcoholic hydrochloric acid, whereupon the compound sought separates as white crystals having a melting point of 147–148° C. and readily soluble in water.

3. Diethylaminoethyl (alpha amyl) cinnamate hydrochloride,

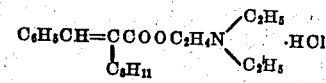

A solution of 12 g. of alpha amyl cinnamic acid in 25 cc. of absolute alcohol is added to a solution of 2.5 g. of sodium in 30 cc. of absolute alcohol; to the clear solution of the sodium salt thus formed, a solution of 9.5 g. of diethylaminoethyl chloride hydrochloride in 20 cc. of absolute alcohol is added, and the reaction mixture is boiled under reflux for 2 hours; the sodium chloride separated during refluxing is removed by filtration, the solution is concentrated to about 20 cc., and sufficient anhydrous ether solution of hydrochloric acid is added to precipitate the amino ester hydrochloride; the gelatinous precipitate separated is dissolved in water and alkalinized, the free base of the amino ester is extracted with ether, the ethereal solution is dried over fused potassium carbonate and treated with an equivalent quantity of a solution of hydrochloric acid in ether; and the gelatinous mass separated is dissolved in water and dried under vacuum over phosphorus pentoxide, yielding the compound sought as a hygroscopic white granular substance freely soluble in water and in warm benzene.

4. N-alpha-ethyl-cinnamyl N'-diethyl ethylene diamine hydrochloride,

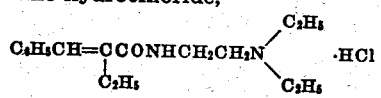

A solution of 11.5 g. of alpha ethyl cinnamyl chloride in 25 cc. of benzene is gradually added to a solution of 6.9 g. of unsymmetrical diethyl ethylene diamine in 50 cc. of dry benzene, and the reaction mixture is cooled to room temperature; and the copious yellow precipitate is washed several times with dry benzene and once with dry acetone. There remains the compound sought, in the form of snow-white crystals having a melting point of 162.5–163.5° C. and dissolving readily in water.

5. Diethylaminoethyl (alpha methyl) cinnamate hydrochloride,

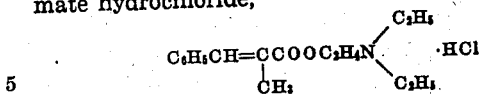

8.2 g. of diethylamino ethanol dissolved in 30 cc. anhydrous ether is refluxed for an hour with a solution of 16.8 g. of methyl cinnamyl chloride in 50 cc. of anhydrous ether; after cooling, the crystalline product, which is the compound sought, is separated by filtration and recrystallized from a mixture of absolute alcohol and ether, giving fine white crystals melting at 133–134.5° C.

6. Diethylaminoethyl (alpha butyl) cinnamate hydrochloride,

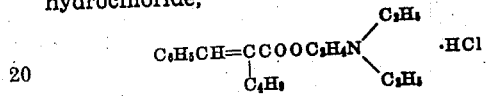

16.3 g. of alpha butyl cinnamic acid is dissolved in 30 cc. absolute alcohol and added to a solution of 2.9 g. of sodium in 100 cc. of absolute alcohol; 8.6 g. of diethylaminoethyl chloride hydrochloride dissolved in 20 cc. of absolute alcohol is added; the solution is refluxed four hours on an oil bath; the sodium chloride separated is removed by filtration; the alcohol is concentrated to 25 cc.; an anhydrous ethereal solution of hydrogen chloride is added in very slight excess; the compound sought separates out in the crystalline state; recrystallization from dry acetone yields it in the form of white crystals melting at 105.5–106.5° C.

7. Dibutylaminopropyl (alpha ethyl) cinnamate hydrochloride,

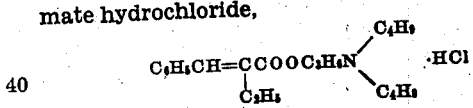

15.2 g. of alpha ethyl cinnamic acid dissolved in 20 cc. of absolute alcohol is added to a solution of 1.9 g. of sodium dissolved in 25 cc. of absolute alcohol; the mixture is refluxed for two hours; the sodium chloride separated is removed by filtration; the alcohol solution is concentrated almost to dryness and diluted with ether; unreacted sodium alpha ethyl cinnamate is removed by filtration; the solution is treated with an excess of ethereal hydrogen chloride and extracted with water; the extract is alkalinized, and extracted with ether; the ether solution is thoroughly dried by means of anhydrous potassium carbonate; and by the addition of ethereal hydrogen chloride to the filtered ether solution, the compound sought is precipitated as a sirupy noncrystallizing substance, of which an approximately 2% aqueous solution can be prepared.

8. N-alpha-methyl-cinnamyl N'-diethyl ethylene diamine hydrochloride,

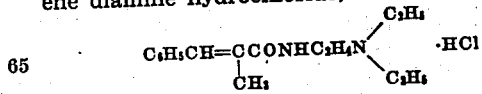

8.0 g. of alpha methyl cinnamyl chloride dissolved in 30 cc. of absolute ether is refluxed for three hours with a solution of 3.9 g. of diethyl ethylene diamine in 30 cc. of anhydrous ether; the crystalline product, which is the desired compound, is separated by filtration, and after recrystallization from acetone is in the form of white crystals melting at 111–112.5° C.

9. N-alpha-butyl-cinnamyl N'-diethyl ethylene diamine hydrochloride,

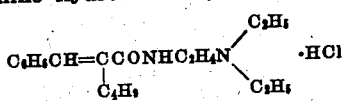

17.6 g. of alpha butyl cinnamyl chloride dissolved in 50 cc. of anhydrous ether is added to a solution of 6.9 g. of unsymmetrical diethyl ethylene diamine in 50 cc. of anhydrous ether; after refluxing for a short time and cooling, the compound sought crystallizes out and on filtration, washing with ether, and recrystallization from acetone is obtained in the form of white crystals melting at 123–124° C.

10. N-alpha-amyl-cinnamyl N'-diethyl ethylene diamine hydrochloride,

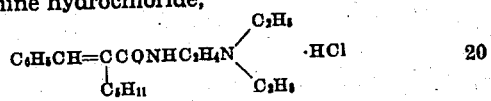

A solution of 5 g. of alpha amyl cinnamyl chloride in 15 cc. anhydrous ether is added to a solution of 1.8 g. of unsymmetrical diethyl ethylene diamine in 15 cc. anhydrous ether, and the mixture is refluxed for about an hour; on cooling, the compound sought separates as white crystals, which, after being washed several times with anhydrous ether, melt at 84–95° C.

11. Diethylaminoethyl (alpha phenyl beta propyl) acrylate hydrochloride,

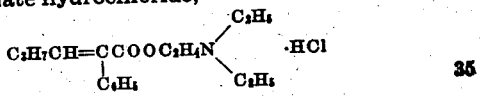

8.8 g. of alpha phenyl beta propyl acrylic chloride in 20 cc. of dry benzol is added to 3.9 g. of diethyl aminoethyl alcohol in 25 cc. of benzol, and the mixture is refluxed two hours; the solution is concentrated, diluted with ether, and extracted with acidulated water; the aqueous solution is alkalinized and extracted with ether; the ether solution is dried with potassium carbonate, filtered, and treated with a very slight excess of ethereal hydrogen chloride; and the compound sought separates as a noncrystallizing sirupy mass.

12. Diethylaminoethyl (alpha ethyl) o-chloro cinnamate hydrochloride,

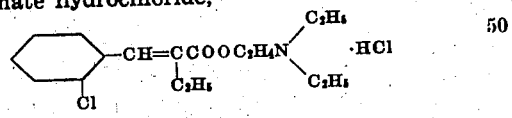

14.0 g. of alpha ethyl o-chloro cinnamyl chloride is refluxed about six hours with 5.4 g. of diethylaminoethyl alcohol in about 75 cc. of anhydrous benzol, the crystals first formed later redissolving; the solution being allowed to stand, the compound sought crystallizes out, and after separation by filtration, washing with benzol, and several recrystallizations from dry acetone, is obtained in the form of fine white crystals melting at 127.5–128° C.

13. Diethylaminoethyl (alpha ethyl) p-dimethylamino cinnamate hydrochloride,

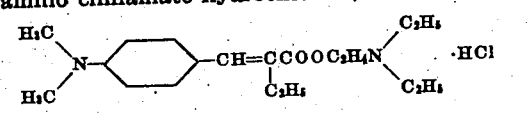

1.92 g. of metallic sodium is dissolved in 50 cc. of absolute alcohol; 18.4 g. of alpha ethyl p-dimethylamino cinnamic acid dissolved in 100 cc. of absolute alcohol is added; the mixture is refluxed for an hour; a solution of diethylaminoethyl chloride is added; the mixture is refluxed for five hours; the sodium chloride is removed by filtration and the alcohol is distilled off; the remaining 30 cc. is diluted with 30 cc. of anhydrous ether; ethereal hydrogen chloride being added in a slight excess, the compound sought precipitates as pale-yellow crystals which, after recrystallization from acetone containing 1% absolute alcohol and drying, melt at 170-171° C.

Below are listed further exemplificative compositions, which may be prepared by such processes as are described in the foregoing examples:

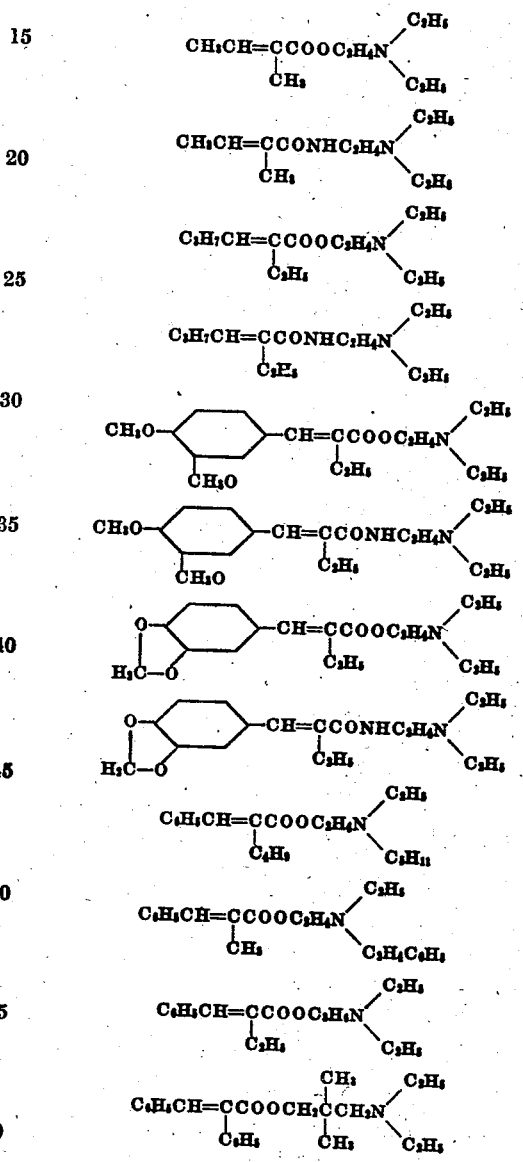

It is to be understood that the foregoing examples are merely illustrative and by no means limitative of the invention, which may be variously otherwise embodied—as with respect to particular compositions and processes—within the scope of the appended claims.

I claim:

1. Compounds selected from the group having the general formulas Y,Z-amino-alkyl α-R' β-R acrylate and Y,Z-amino-alkyl α-R' β-R acrylamid wherein R represents one of the radicals alkyl, aryl, and halogen-, alkoxy-, alkylene-dioxy-, and dialkylamino-aryl, R' represents one of the radicals alkyl and aryl, and Y and Z represent radicals of the class consisting of alkyls and aralkyls; and the inorganic salts thereof.

2. Compounds selected from the group having the general formulas Y,Z-amino-alkyl α-R' β-R acrylate and Y,Z-amino-alkyl α-R' β-R acrylamid wherein R represents one of the radicals aryl and halogen-, alkoxy-, alkylenedioxy-, and dialkylamino-aryl, R' represents one of the radicals alkyl and aryl, and Y and Z represent radicals of the class consisting of alkyls and aralkyls; and the inorganic salts thereof.

3. Compounds selected from the group having the general formulas Y,Z-amino-alkyl α-R' β-R acrylate and Y,Z-amino-alkyl α-R' β-R acrylamid wherein R represents an aryl, R' represents one of the radicals alkyl and aryl, and Y and Z represent radicals of the class consisting of alkyls and aralkyls; and the inorganic salts thereof.

4. Compounds selected from the group having the general formulas Y,Z-amino-alkyl α-R' cinnamate and Y,Z-amino-alkyl α-R' cinnamamid wherein R' represents one of the radicals alkyl and aryl, and Y and Z represent radicals of the class consisting of alkyls and arlkyls; and the inorganic salts thereof.

5. Compounds selected from the group having the general formulas Y,Z-amino-alkyl α-R' cinnamate and Y,Z-amino-alkyl α-R' cinnamamid wherein R' represents an alkyl, and Y and Z represent radicals of the class consisting of alkyls and aralkyls; and the inorganic salts thereof.

6. Compounds selected from the group having the general formulas Y,Z-amino-ethyl α-R' cinnamate and Y,Z-amino-ethyl α-R' cinnamamid wherein R' represents an alkyl, and Y and Z represent radicals of the class consisting of alkyls and aralkyls; and the inorganic salts thereof.

7. Compounds selected from the group having the general formula Y,Z-amino-alkyl α-alkyl cinnamate wherein Y and Z represent radicals of the class consisting of alkyls and aralkyls; and the inorganic salts thereof.

8. Compounds selected from the group having the general formula Y,Z-amino-alkyl α-alkyl cinnamamid wherein Y and Z represent radicals of the class consisting of alkyls and aralkyls; and the inorganic salts thereof.

9. Compounds selected from the group having the general formula Y,Z-amino-alkyl α-R' β-R acrylate wherein R represents one of the radicals alkyl, aryl, and halogen-, alkoxy-, alkylenedioxy-, and dialkylamino-aryl, R' represents one of the radicals alkyl and aryl, and Y and Z represent radicals of the class consisting of alkyls and aralkyls; and the inorganic salts thereof.

10. Compounds selected from the group having the general formula Y,Z-amino-alkyl α-R' β-R acrylamid wherein R represents one of the radicals alkyl, aryl, and halogen-, alkoxy-, alkylenedioxy-, and dialkylamino-aryl, R' represents one of the radicals alkyl and aryl, and Y and Z represent radicals of the class consisting of alkyls and aralkyls; and the inorganic salts thereof.

11. N-α-butyl-cinnamyl N'-diethyl ethylene diamine hydrochloride.

12. Diethylaminoethyl (alpha ethyl) cinnamate hydrochloride.

13. Diethylaminoethyl (alpha isopropyl) cinnamate hydrochloride.

WILLIAM A. LOTT.